United States Patent
Waning et al.

[15] 3,667,194
[45] June 6, 1972

[54] INSTALLATION FOR EXTRACTING GAS FROM GRANULES

[72] Inventors: Hendrik Waning, Heleen; Hubertus A. Mannens, Hoensbroek; Arnoldus A. W. Schaapveld, Stein, all of Netherlands

[73] Assignee: Stamicarbon N.V., Hurlen, Netherlands

[22] Filed: Oct. 20, 1969

[21] Appl. No.: 867,769

[30] Foreign Application Priority Data
Oct. 19, 1968 Netherlands..........................6815007

[52] U.S. Cl..............................55/247, 23/267 A, 23/267 R
[51] Int. Cl.......................................B01d 45/02
[58] Field of Search.........................................55/244, 247; 261/119–124; 23/267 A, 267 R

[56] References Cited
UNITED STATES PATENTS 2,976,129  3/1961  Buehler..............................23/267 A
3,155,472  11/1964  Huppke..................55/233
3,325,976  6/1967  West......................55/277

FOREIGN PATENTS OR APPLICATIONS
129,188  9/1961  U.S.S.R. ..................23/267

Primary Examiner—Bernard Nozick
Attorney—Cushman, Darby & Cushman

[57] ABSTRACT

In order to dislodge our bubbles from particles e.g. cut cylindrical fibers, as they enter a confined liquid body through a surface, a small portion of the liquid body near the surface is vibrated and the particles are funneled into the liquid body through the surface by means calculated to subject each particle to about the same amount of vibration. By preference this includes funneling the particles onto the central region of a submerged, perforated plate. The particles vibrate to the periphery of the plate and fall into the gap between the plate and the confining walls of the liquid body. In a counter current liquid extraction system, liquid may pass up through the plate perforations.

5 Claims, 4 Drawing Figures 3,667,194

INSTALLATION FOR EXTRACTING GAS FROM GRANULES

BACKGROUND OF THE INVENTION

In the production of certain products from synthetic plastics material, filaments of the plastic are chopped into short lengths, thus becoming granules. When these granules still contain solvents utilize in the production of the filaments, the granules are fed to a body of liquid in an extraction column for the purpose of removing and recovering the solvent from the granules.

The invention relates to a apparatus for extracting granules in which the granules are fed into a liquid from above. The moment the granules break through the liquid surface, an air bubble is seen to adhere to most of them. For various reasons these air bubbles constitute an interfering factor. In the first place they reduce the granule surface that is in contact with the liquid and, in consequence, retard the extraction process. Secondly, many bubbles are stripped off while the granules are descending through the liquid, and combine to form large ascending bubbles which, especially in the normally employed long vertical extraction column, cause considerable mixing of the granule stream and thus interfere with downward transport.

These drawbacks make themselves particularly felt in the extraction of plastic particles formed by cutting of extruded filaments. The extraction takes place mainly on the cut surface and hardly on the cylindrical surface. The air bubbles adhere predominantly to the cut surface, notably to the cutting burr, with the result that the mass-transfer surface becomes largely or completely inaccessible.

It has appeared that air bubbles may be dragged along by approximately 70 percent of the granules and that the adherence of the bubbles to the granules is very strong. The adherence to the cut surface is approximately ten times that to the cylindrical surface. Even when the granules are sliding over one another, the bubbles are not stripped off.

An attempt at preventing air-bubble formation by allowing the granules to slide slowly into the liquid did not give an improvement, because the liquid enclosed some air together with the granules. For the same reason it did not prove possible to fill a granule-packed column with liquid from below without inclusion of air-bubbles.

The invention provides an apparatus wherein the air bubbles are removed from the granules closely below the liquid surface. This is achieved by maintaining a low-frequency vibration in the upper part of the liquid. It is surprising that the number of granules carrying an air bubble can thus be made negligibly small. The vibrations can be generated with simple means, because they are needed only in a very small part of the column. The extraction mainly takes place in the remaining part of the column.

The use of vibrations for other reasons is a well-known practice in extraction processes. For example, a whole column is set in ultrasonic vibrational motion to ensure that the solid material is continuously brought into contact with fresh liquid. A known drawback is that the installation is expensive and that the vibrations may, in a mechanical respect, have a harmful effect on the column. In another known practice the granules are not immersed, but irrigated, while they are transported over vibrating dishes. The object of vibrating is not only to transport the granules, but also to effect atomization of the liquid. However, this process does not provide a solution to the problem that has given the impetus to the present invention.

The vibrations can be generated by a horizontally disposed vibration plate on which the granules are received under the liquid surface, the said plate leaving some space for discharging the granules over the edge thereof. It has appeared that the majority of granules do not carry adhering air bubbles when they are delivered onto the plate. This is probably to be ascribed to the fact the vibrations are communicated to the surface of the liquid. Any still adhering air bubbles are detached when the granules are hopping towards the edge of the plate.

Preferably, the plate is provided with perforations, each of a diameter which is smaller than the granule diameter. If the extraction is carried out in a flowing, e.g. ascending body of liquid, the flow experiences only little hindrance from the plate.

In order that the granules will be so transported over the plate that all of them have approximately the same residence time on the plate, they are supplied through a funnel which has its outlet disposed over the center of the plate. In columns in which a constant level is difficult to maintain it may be recommendable to combine the funnel and the plate into an integral unit constructed as a float. The distance between the plate and the liquid surface will then remain constant.

The invention will now be elucidated with reference to the drawing.

Figure 1:
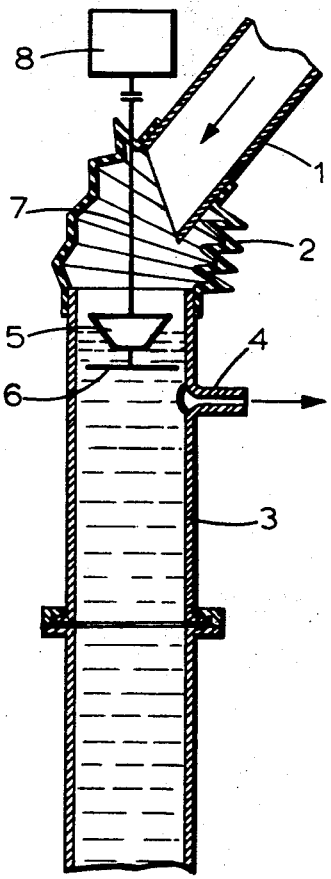
FIG. 1 shows a longitudinal section of the head of an extraction column according to the invention.

In the extraction column, the head of which is shown in FIG. 1 continuous extraction takes place according to the counter-flow principle. The solid material is fed in through a pipe 1 which is connected to a glass upper part 3 by a rubber sleeve. Said upper part serves to permit inspection e.g. by means of one or several light sources and photodetectors (not shown). The liquid is carried off through a connection 4. The column-dimensions are e.g. height 6 m, inner diameter 0.3 m. The inner diameter of upper part 3 may be much smaller, however, e.g. 0.1 m.

Figure 2:
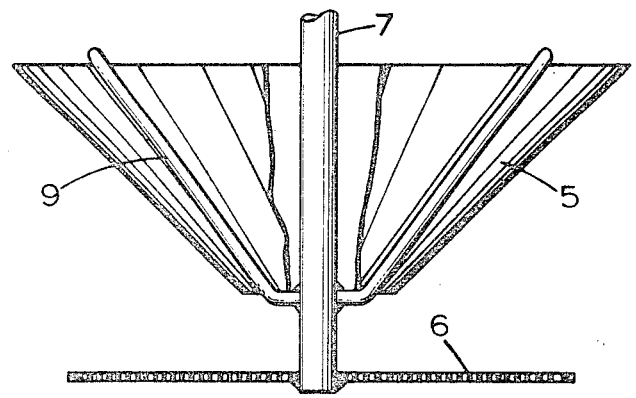
FIG. 2 is elevational side view showing a cross section through the funnel and the vibration plate in FIG. 1 on a larger scale.
Figure 3:
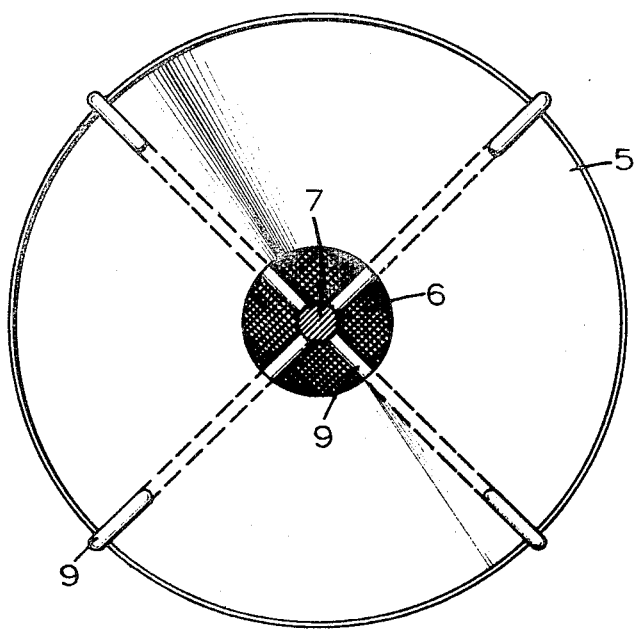
FIG. 3 is a top view of the installation in FIG. 2.

In the upper part of the extraction column of the installation according to FIGS. 1–3, a funnel 5 and a perforated plate 6 are suspended on a rod 7 which projects through the rubber sleeve 2 and is connected with a vibrator 8. The funnel is attached to rod 7 by hooks 9.

Plate 6 and funnel 5 are both vibrated by vibrator 8. The vibrations propagate through the liquid up to the surface. The granules supplied through pipe 1 entrain fewer air bubbles in breaking through the liquid surface than in the event the liquid were not vibrated. The funnel 5 directs the granules towards the center of perforated plate 6. Said plate may also be made of screen gauze. The granules hop over the plate 6 towards the circumference where they drop down through the gap between plate and column wall. On leaving the plate the granules have been stripped of adhering air bubbles so that during their long travel through the column they can be extracted without any hindrance.

The perforations in plate 6 serve a useful purpose irrespective of whether connection 4 is disposed above or below plate 6. In the first case, and with a non-perforated plate, there will be constant upward flow in the gap between the plate and the wall, which may prevent the granules from descending. These granules are then dragged along, to be ultimately discharged together with the liquid. This does not happen when the main body of the flow can pass through the perforations in the plate in such a way that the upward flow will in no place be so fast as to prevent the granules from gravitating through the column. In the second case, represented in FIG. 1, the performance of an installation with a non-perforated plate is also disturbed if the flow volume fluctuates, so that higher velocities are produced in the gap. The granules will then temporarily accumulate over the plate. They are indeed continuously discharged but, owing to the abovementioned phenomenon, the air bubbles are not sufficiently removed.

Figure 4:
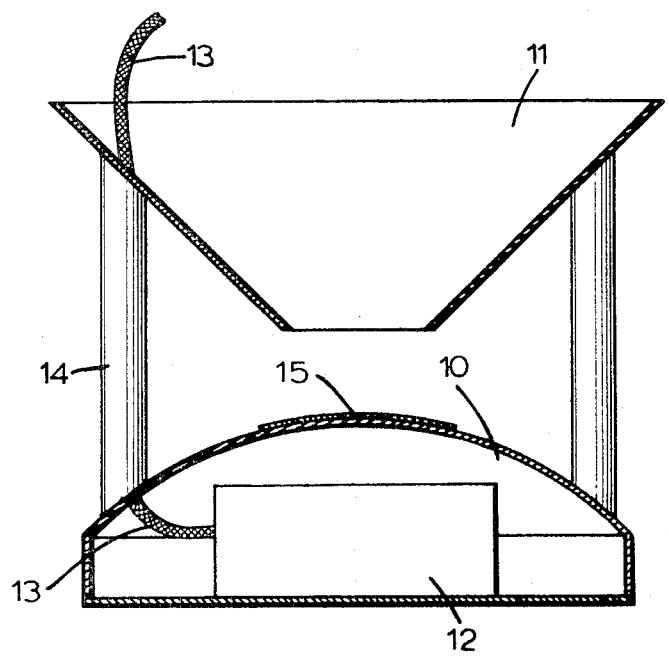
FIG. 4 shows a longitudinal section of a modification of the device of FIG. 2 wherein the plate and funnel are mounted on a float which also mounts the vibrator.

Another embodiment is illustrated in FIG. 4. Here a funnel 11 is mounted on a float 10. Float 10 comprises an electric vibrator 12, which is connected with a current source by means of a flexible cable 13. The cable may be carried through tube 14 on which the funnel is supported. A wear-resistant plate 15 is mounted on the top of float 10.

Application of this float has the advantage that the distance between plate 15 and the liquid surface will remain constant, even if the height of the surface in the column should vary. The liquid may reach up, for example, to halfway the height of the funnel.

For the size of column described hereinbefore, by way of example: the perforated plate 6 is spaced e.g. 10 cm below the upper level of liquid in the column, the perforated plate 6 has an outer diameter sized to leave an annular gap 0.3 cm whide between the plate and the column side wall. Further, in this typical example the granules may be chopped filaments of polycaprolactam, each about 1.5 to 2.5 mm in diameter and about 1.5 to 2.5 mm long, in an instance where the perforations in the plate 6 are e.g. 1 mm in diameter. To exemplify the extraction, in a typical operation the object would be to remove 0.45 kilograms monomers and oligomers from 5 kilograms per hour of said granules dispensed into the column from above, using water as an extraction liquid at a mass flow rate of 8.3 liters per hour, in a constant upward flow in the column and at a temperature of about 90° to 100° C, all by way of example.

By "low frequency" it is meant that the vibrator 8 or 12 produces vibrations on the order of 80 to 120 cycles per second which, in the example, is seen to vibrate the perforated plate 6 at an amplitude of about 1.3 mm and the upper surface of the liquid at amplitude of about 0.1 mm. At a depth of about 0.5 meter, in the liquid the vibration is of substantially 0 amplitude.

What is claimed is

1. Apparatus for dislodging gas bubbles from solid particles fed from a gaseous environment into a body of liquid, confined in a column, through an upper surface of the liquid, comprising:

means for setting up a localized, low frequency vibration in the body of liquid to vibrate only that portion of the body of liquid which lies adjacent and up to the said upper surface; and means for funnelling the particles from the gaseous environment to a particular submerged region in the vibrated portion of said body of liquid;

a perforated support in the form of a plate, said support being disposed in said particular submerged region to temporarily support quanta of said particles reaching said region, said support being of lesser transverse peripheral extent than the cross-sectional area of said column whereby quanta of particles fed to said support move thereacross and fall from the periphery therefrom and from the vibrated portion of said body of liquid and into the remainder of said body of liquid after being subjected to a predetermined average amount of vibration; and buoyant float means, said support plate being secured to said float means and said float means floating in said body of liquid.

2. The apparatus of claim 1 wherein said funnelling means comprises a unitary structure with said support plate and said float whereby said funnelling means and said support plate rise and fall with said float as said body of liquid upper level rises and falls.

3. In a particle treating column having an upwardly flowing body of liquid filling the column up to a level within the column: means defining a liquid outlet from the column disposed below the upper level of the liquid; a transverse plate disposed in the column between the liquid outlet and the upper level of the liquid, said plate occupying less than the entire internal transverse cross-section of the column; means for vibrating the plate; a tapering funnel having an upper, larger diameter end disposed above the liquid upper level and a smaller diameter lower end disposed below the liquid upper level, adjacent the center of the plate, so particles to be shaken free of air bubbles after passing through said liquid upper level may be poured through the funnel onto the center of the plate, whereupon the vibrations dislodge air bubbles from the exterior of the particles and then the particles fall from the plate into the liquid below the plate;

the plate being perforated with liquid-passing perforations having a smaller diameter than the size of the particles to be treated;

the plate being of a smaller diameter than the internal transverse cross-section of the column, by an amount sufficiently great as to permit the particles to pass between the outer periphery of the plate and the column after the particles have migrated from the center to the outer periphery of the plate;

said funnel being a distinct element from the column, and said means for vibrating the plate physically interconnecting the funnel with the plate to provide a substantially self-contained unit of physically interrelated elements including the vibrating means, the plate and the funnel, in which the funnel vibrates as the plate is vibrated.

4. In a particle treating column having an upwardly flowing body of liquid filling the column up to a level within the column: means defining a liquid outlet from the column disposed below the upper level of the liquid; a transverse plate disposed in the column between the liquid outlet and the upper level of the liquid, said plate occupying less than the entire internal transverse cross-section of the column; means for vibrating the plate; a tapering funnel having an upper, larger diameter end disposed above the liquid upper level and a smaller diameter lower end disposed below the liquid upper level, adjacent the center of the plate, so particles to be shaken free of air bubbles after passing through said liquid upper level may be poured through the funnel onto the center of the plate, whereupon the vibrations dislodge air bubbles from the exterior of the particles and then the particles fall from the plate into the liquid below the plate;

the plate being perforated with liquid-passing perforations having a smaller diameter than the size of the particles to be treated;

the plate being of a smaller diameter than the internal transverse cross-section of the column, by an amount sufficiently great as to permit the particles to pass between the outer periphery of the plate and the column after the particles have migrated from the center to the outer periphery of the plate;

the plate and funnel being secured to a float in substantially fixed relation thereto, the float being adapted to dispose the funnel and plate at respectively fixed distances with respect to the upper level of liquid.

5. The apparatus of claim 4 wherein the vibrator is mounted on the float, so that the vibrator, funnel and plate comprise a substantially self-contained unit of physically interrelated elements.

* * * * *